Oct. 21, 1969  J. F. HELMS  3,473,856
SEAL FOR BEARING
Filed Aug. 25, 1967

INVENTOR:
JOHN F. HELMS
BY Howson &
Howson
ATTYS.

United States Patent Office 3,473,856
Patented Oct. 21, 1969

3,473,856
SEAL FOR BEARING
John F. Helms, Warminster, Pa., assignor to SKF Industries, Inc., King of Prussia, Pa., a corporation of Delaware
Filed Aug. 25, 1967, Ser. No. 663,328
Int. Cl. F16c *1/24, 33/78;* F16j *15/54*
U.S. Cl. 308—187.2                                    1 Claim

ABSTRACT OF THE DISCLOSURE

A seal for sealing the annular space between inner and outer rings of a bearing assembly wherein the outer ring has a circumferentially extending groove comprising a ring-like reinforcing member and a resilient member bonded to one face of the reinforcing member having a circumferentially extending feathered lip adapted to engage and provide a seal with the inner ring and a bead of C-shaped cross section projecting from the opposite end adapted to seat in the annular groove in the outer ring to support the seal in the bearing assembly and provide an effective seal at the juncture with the outer ring.

---

The present invention relates to a sealing device for sealing the interstice between spaced confronting surfaces of a pair of relatively rotatable members.

The seal of the present invention is particularly suitable for sealing the annular space between inner and outer rings of a bearing assembly to retain lubricant in the annular space and prevent leakage and also to exclude dirt and foreign matter from entering the annular space which would contribute to wear of the bearing and premature failure thereof.

Some prior bearing seals used for this purpose were the so-called "stake" type comprising an annular reinforcing member which at its outer edge is adapted to be force fitted into a groove in the outer ring and a resilient member having a flared inner lip which engages the inner ring. This type of seal has several disadvantages and drawbacks. For example, the assembly of the seal in the outer ring often distorts the outer ring in order to firmly seat the seal in place. Furthermore, the seal is difficult to remove and once removed, it cannot be replaced. Often removal of the seal results in damage to the outer ring. By reason of the fact that the outer engaging portions of the seal and outer ring are metal to metal, it is difficult to wedge the two together to provide an adequate seal at this juncture.

Still another type of seal commonly used for this purpose comprises a ring-like reinforcing member made of metal which is embedded in an outer casing of a resilient material such as rubber having a bulbous outer bead adapted to seat in the groove in the outer ring and a flared inner lip which engages the inner ring. This type of seal is more satisfactory than the "stake" seal in some respects. However, this type of seal also has some disadvantages. For example, it has been found that the bulbous outer bead does not always conform to the groove in the outer ring and hence does not provide the desired sealing action at this juncture. Furthermore, even though the casing is made of rubber, the bulbous outer bead has a fair amount of rigidity since the metal reinforcing member projects into the bead and hence, the seal has to be designed accurately to permit assembly into the groove of the outer ring.

The present invention provides an improvement in seals of this type characterized by novel features of construction and arrangement contributing to self-tightening upon assembly, ease of assembly and better size control for various rubber compounds used to make the seal which may be manufactured in a common mold. To this end, the seal comprises an annular reinforcing member made of metal having a generally upright or radial center portion and a frusto-conical section projecting from one end of the body portion and a frusto-conical section projecting from the inner end which terminates in a short radially inwardly projecting leg. The seal further includes a molded rubber configuration adhered to one face of the metal reinforcing member which has a tapered lip depending from the inner edge which engages the inner ring to provide a seal at the juncture thereof and a projecting bead portion at its opposite end which is of generally C-shaped cross section. The inboard side of the seal has a generous radius blending with the outside diameter flap and this radius centers the seal and provides a "lead-in" form into the outer ring seal groove. The bead or tire of rubber that is between the metal reinforcing member and the outside diameter radius is undercut to provide a relief to facilitate flexing or folding of the bead as it is inserted through the entering diameter of the outer ring seal groove. These features combined allow the seal to be constructed with more than the normal amount of interference with the outer ring seal groove whereby it can be manufactured more economically. Further, this flexibility of the C-shaped bead enables the seal to conform to the shape of the groove thereby providing a compensation for outer ring seal groove distortion. In this manner, a tighter sealing action is provided between the seal and the outer ring.

The outer flared portion of the metal insert guarantees seal stability and locates all the deformation of the C-shaped bead in the outer ring seal groove area where it is needed to provide a tight seal. This offset portion of the metal insert also permits a proportionately larger insert outside diameter, and consequently, the height of the rubber around the insert is held to a minimum. This helps to reduce the variation in seal outside diameter when various rubber compounds are used which are of different shrinkage rates. The control of this variation is important in utilizing one common mold to make seals of different compounds.

Other objects of the present invention and the various features and details of the construction of a seal in accordance with the present invention are hereinafter more fully set forth with reference to the accompanying drawings, wherein.

Figure 1:
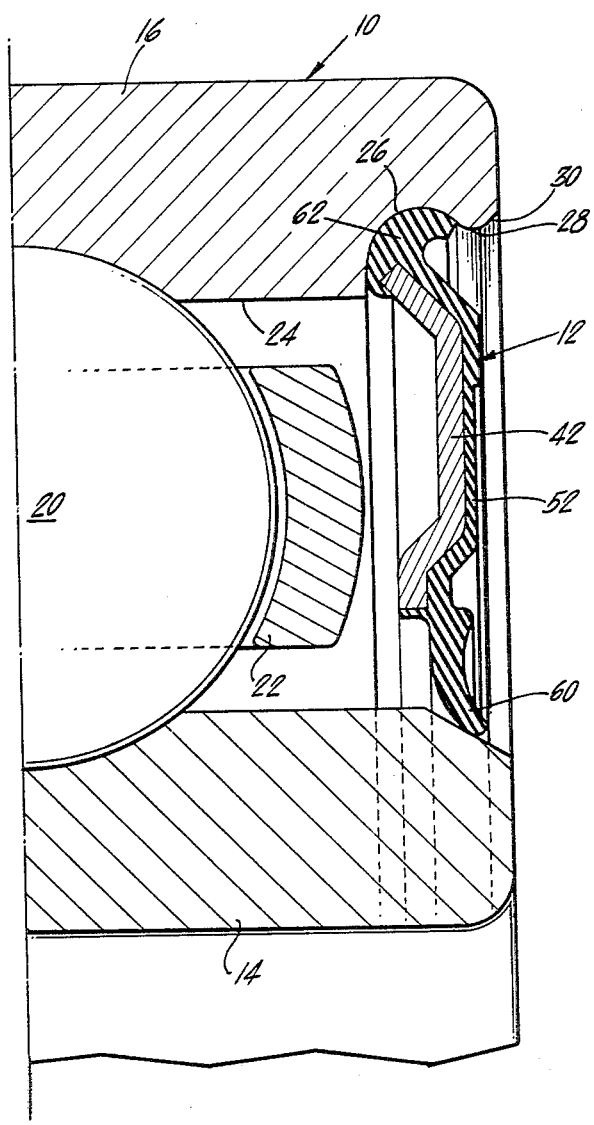
FIG. 1 is an enlarged fragmentary sectional view of a part of a rolling bearing assembly incorporating a seal constructed in accordance with the present invention.
Figure 2:
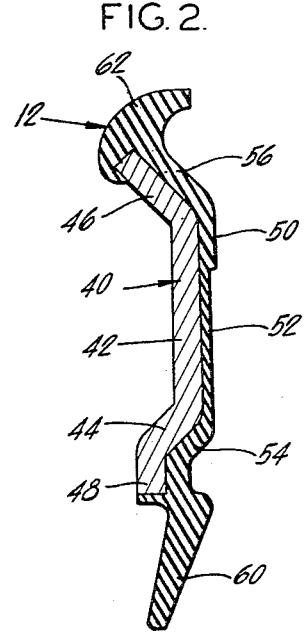
FIG. 2 is a sectional view through the seal.
Figure 3:
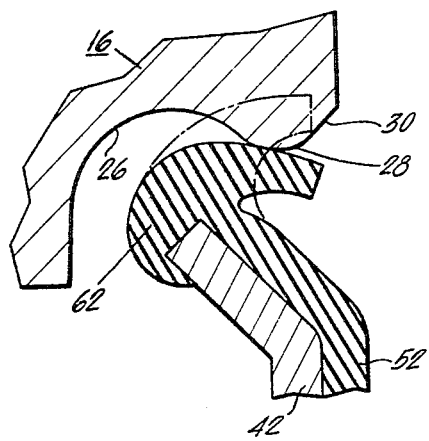
FIG. 3 is an enlarged fragmentary sectional view showing the seal being installed in the outer ring of the bearing assembly.

Referring now to the drawing, there is shown in FIG. 1 a bearing assembly generally designated by the numeral 10 incorporating a seal 12 constructed in accordance with the present invention. The bearing assembly 10 comprises radially spaced inner and outer rings 14 and 16 respectively having the usual raceways therein to support and guide a plurality of rolling elements, in the present instance balls 20, and a cage 22 in the annular space 24 between the race rings to circumferentially space and guide the rolling elements. The seal 12 may be provided at each axial end of the annular space and to this end, there is provided an annular locking groove 26 disposed between a radially inwardly projecting lip 28 and a radially extending shoulder 30. In the present instance, the diameter of the opening provided by the lip 28 is smaller than the diameter of the groove and greater than the inner peripheral wall of the outer ring. Further, as illustrated, the outer ring is provided with a circumferentially extending chamfered surface 30 outboard of the lip 28 to provide a guide surface for assembly as the seal as explained in more detail hereinafter.

In accordance with the present invention, a seal is provided which is detachably secured to the bearing assembly at either or both axial ends of the annular space and which has novel features of construction and arrangement providing an effective seal between the rings to retain lubricant interiorly of the bearing to lubricate the rolling elements and prevent infiltration of dust and foreign matter into the annular space which tend to cause wear and premature failure of the bearing assembly. To this end, the seal includes a ring-like reinforcing member 40 made, for example of metal, having a flat radially extending central or body portion 42 and a pair of inner and outer frusto-conical portions 44 and 46 projecting angularly rearwardly from the inner and outer edges of the central body portion 42 and formed integrally therewith. The metal insert further includes a short radially extending leg portion 48 depending from the inner edge of the diverging frusto-conical portion 44.

The annular sealing element which may be cast and molded to the outer face of the reinforcing member, comprises a section 50 conforming generally to the contour of the outer face of the reinforcing member and thus, consists of a radial section 52 which is of an enlarged thickness adjacent the upper portion thereof, inner and outer frusto-conical sections 54 and 56 overlying the divering inner and outer frusto-conical portions of the reinforcing member and a short radial leg section 58 at its lower end. The annular sealing element further includes a feathered lip portion 60 at its lower end which, as illustrated in the drawings, tapers or is angled inwardly and is adapted to engage a surface on the inner ring to provide a seal at the juncture. At its opposite end the annular sealing element includes a C-shaped head portion 62 which is adapted to seat in the annular groove in the outer ring. The C-shaped head portion centers the seal and provides "lead-in" form into the outer ring seal groove. Further, the tire of rubber which is between the metal insert and the outside diameter radius has been undercut on the outboard side of the seal to provide a relief into which the rubber can fold as it is inserted through the tapered or chamfered portion of the outer ring and through the lip on the outboard side of the groove. Both these features combine to permit the seal to be constructed with more than the normal amount of interference with the outer ring seal groove, thereby positively compensating for the outer ring seal groove distortion and thereby providing a tight effective seal with the outer ring. Further, as illustrated, the outside diameter of the metal insert is flared into the face of the hinge portion of the rubber outside diameter form and this feature guarantees seal stability and forces all the rubber deformation to be in the outer ring seal groove area where it is needed to provide a tight seal. This flared portion also permits a proportionately larger insert outside diameter and consequently the height of the rubber around the insert is held to a minimum. This helps to reduce the variation in seal outside diameter when various rubber compounds are used which have different shrinkage rates. Controlling this variation, as noted above, is important to that one common mold may be used to make seals of different contacts.

While a particular embodiment of the present invention has been illustrated and described herein it is not intended to limit the invention and changes and modifications may be made within the scope of the following claim.

I claim:

1. In a rolling bearing assembly comprising a pair of rings spaced apart to define an annular space therebetween and a plurality of rolling elements in the annular space between the rings, one of the rings having a circumferentially extending locking groove disposed between a radially inwardly projecting lip and a radially extending shoulder, a seal for sealing the annular space between the rings comprising a ring-like reinforcing member and an annular sealing element secured to one face of the reinforcing member, said reinforcing member comprising a flat radially extending central portion, a pair of inner and outer frusto-conical portions projecting angularly rearwardly from the inner end outer edges of the central body portion and a short radially extending leg depending from the inner frusto-conical portion of the reinforcing member, said annular sealing element also consisting of a central radial section confronting the outer face of the central portion of the reinforcing member and frusto-conical portions overlying and conforming to the inner and outer frusto-conical portion of the reinforcing member, said sealing element having a feathered lip portion extending radially beyond said leg and disposed at an inward angle relative to the central body portion of said reinforcing member adapted to engage the other of said pair of rings and a circumferentially extending bead of C-shaped cross section extending radially beyond the opposite edge of said reinforcing member adapted to seat in the locking groove in said one ring, the configuration of said C-shaped bead permitting easy assembly of the seal and providing an effective seal around the entire circumference of the ring.

References Cited

UNITED STATES PATENTS

| | | | |
|---|---|---|---|
| 2,734,757 | 2/1956 | Martin | 277—94 |
| 2,755,113 | 7/1956 | Baumheckel | 308—187.2 X |
| 2,888,304 | 5/1959 | Kooistra | 277—94 X |
| 3,049,355 | 8/1962 | Vernon | 277—94 |
| 3,090,628 | 5/1963 | Giulietti | 277—94 |

FOREIGN PATENTS

| | | |
|---|---|---|
| 1,223,901 | 2/1960 | France. |
| 852,993 | 11/1960 | Great Britain. |

JAMES KEE CHI, Primary Examiner

U.S. Cl. X.R.

277—94, 235